United States Patent [19]
Matsumoto

[11] Patent Number: 5,862,104
[45] Date of Patent: Jan. 19, 1999

[54] RECORDING A COMPLETE BROADCAST PROGRAM BY SELECTING FROM A DISPLAYED PROGRAM TEXT

[75] Inventor: Kissei Matsumoto, Kanagawa, Japan

[73] Assignee: Sony Corporation, Tokyo, Japan

[21] Appl. No.: 898,083

[22] Filed: Jul. 22, 1997

[30] Foreign Application Priority Data

Aug. 8, 1996 [JP] Japan .................................. 8-225823

[51] Int. Cl.⁶ .................................................. G11B 31/00
[52] U.S. Cl. .................................. 369/7; 369/53; 369/84; 455/186.1; 455/45; 455/66
[58] Field of Search .................................. 369/7, 53, 84; 348/478, 460, 468, 553, 563, 564, 565, 569, 13; 455/186.1, 45, 66

[56] References Cited

U.S. PATENT DOCUMENTS

| | | | |
|---|---|---|---|
| 5,161,251 | 11/1992 | Mankovitz | 455/66 |
| 5,260,788 | 11/1993 | Takano et al. | 348/478 |
| 5,390,027 | 2/1995 | Henmi et al. | 358/335 |
| 5,497,372 | 3/1996 | Nankoh et al. | 370/69.1 |
| 5,565,997 | 10/1996 | Terry | 348/468 |
| 5,617,383 | 4/1997 | Matsumoto et al. | 369/32 |
| 5,659,366 | 8/1997 | Kerman | 348/460 |
| 5,686,954 | 11/1997 | Yoshinobu et al. | 348/13 |
| 5,701,282 | 12/1997 | Matsumoto et al. | 369/32 |
| 5,731,844 | 3/1998 | Rauch et al. | 348/563 |

FOREIGN PATENT DOCUMENTS

| | | | |
|---|---|---|---|
| 0363653 A2 | 4/1990 | European Pat. Off. | G11B 27/28 |
| 0601814 A2 | 6/1994 | European Pat. Off. | G11B 20/10 |
| 0604871 A1 | 7/1994 | European Pat. Off. | H04H 1/00 |
| 0612067 A2 | 8/1994 | European Pat. Off. | G11B 7/28 |
| 2714760 A1 | 7/1995 | France | G11B 27/031 |
| 4414298 A1 | 10/1995 | Germany | H04B 1/20 |
| 1-143579 | 6/1989 | Japan . | |

OTHER PUBLICATIONS

Patent Abstracts of Japan, vol. 096, No. 002, JP 7–262752, Published Oct. 13, 1995, Sanyo Electric Co. LTD.

*Primary Examiner*—Tod R. Swann
*Assistant Examiner*—Kim-Kwok Chu
*Attorney, Agent, or Firm*—Limbach & Limbach L.L.P.

[57] ABSTRACT

The invention provides recording system in which sub information added to transmitted main information is detected, in which the sub information is compared with pre-stored information in a memory, and in which if the sub information accords with the pre-stored information, recording of the transmitted main information to the recording medium is started. The invention further provides recording system in which the transmitted main information is recorded via memory so as to record the data after point traced back in the memory from the detection timing, whereby start portion of the main information recorded in the recording medium is not lost.

11 Claims, 8 Drawing Sheets

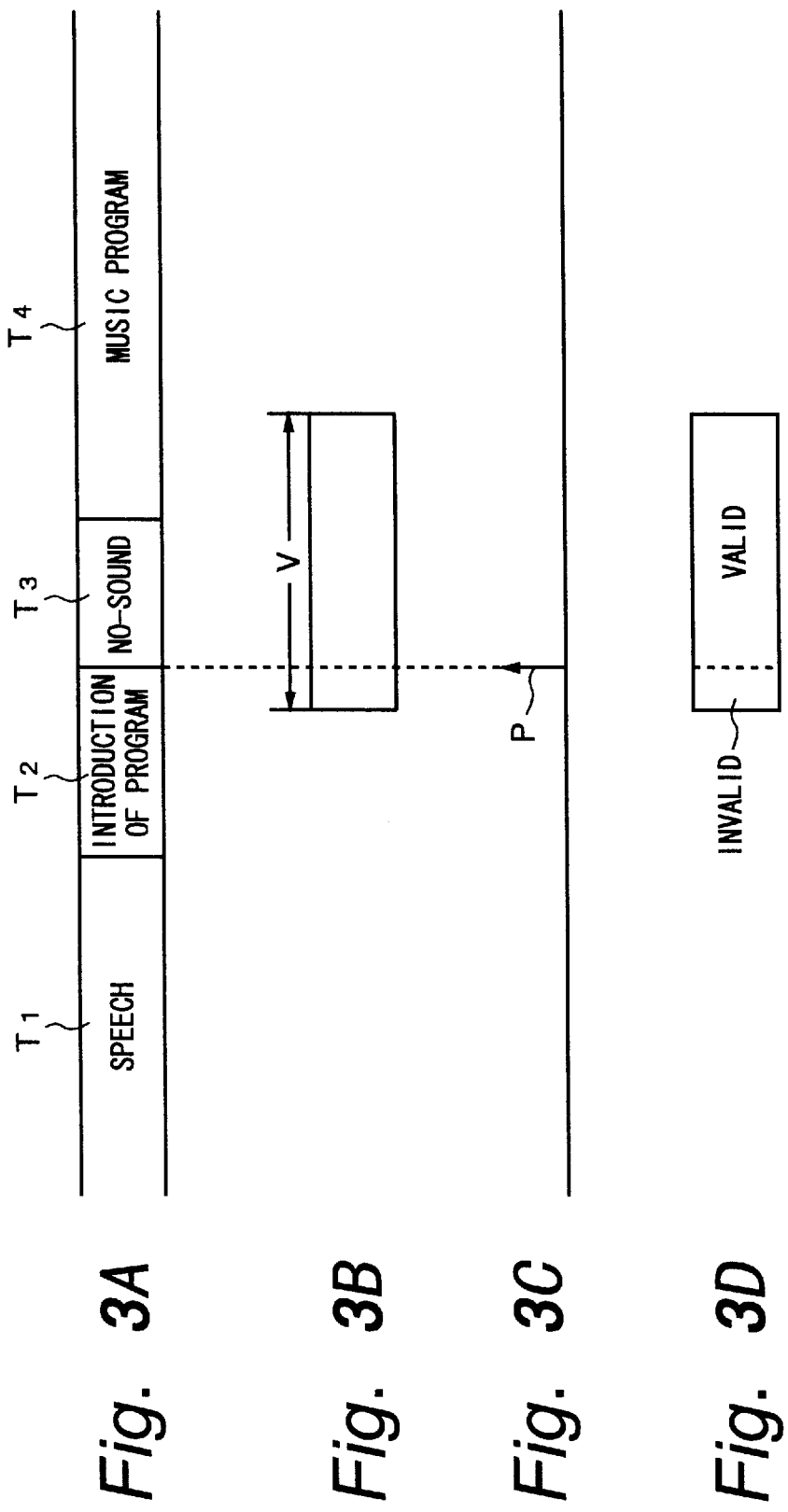

Fig. 4

| | | 16 bits | | 16 bits | | |
|---|---|---|---|---|---|---|
| | MSB　　LSB | MSB　　LSB | MSB　　LSB | MSB　　LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 11111111 | 2 |
| | CLUSTER H | CLUSTER L | 00000000 | 00000000 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | MAKER CODE | MODEL CODE | FIRST TNO | LAST TNO | 7 |
| | 00000000 | 00000000 | 00000000 | USED SECTORS | 8 |
| | 00000000 | 00000000 | 00000000 | 00000000 | 9 |
| | 00000000 | 00000000 | 00000000 | DISC SERIAL NO | 10 |
| TABLE POINTER DATA PORTION { | DISC ID | | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| MANAGEMENT TABLE PORTION (255 PART TABLES) { (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

U-TOC SECTOR 0

Fig. 5

| | 16 bits | | 16 bits | | |
|---|---|---|---|---|---|
| | MSB LSB | MSB LSB | MSB LSB | MSB LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 11111111 | 2 |
| | CLUSTER H | CLUSTER L | 00000001 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| CHARACTER SLOT REPRESENTATION DATA PORTION | 00000000 | 00000000 | 00000000 | P-EMPTY | 11 |
| | 00000000 | P-TNA1 | P-TNA2 | P-TNA3 | 12 |
| | P-TNA4 | P-TNA5 | P-TNA6 | P-TNA7 | 13 |
| | P-TNA248 | P-TNA249 | P-TNA250 | P-TNA251 | 74 |
| | P-TNA252 | P-TNA253 | P-TNA254 | P-TNA255 | 75 |
| | DISC NAME | | | | 76 |
| | DISC NAME | | | LINK INFORMATION | 77 |
| CHARACTER SLOT PORTION (01h) | DISC NAME/TRACK NAME | | | | 78 |
| | DISC NAME/TRACK NAME | | | LINK INFORMATION | 79 |
| (02h) | DISC NAME/TRACK NAME | | | | 80 |
| | DISC NAME/TRACK NAME | | | LINK INFORMATION | 81 |
| (03h) | DISC NAME/TRACK NAME | | | | 82 |
| | DISC NAME/TRACK NAME | | | LINK INFORMATION | 83 |
| (FEh) | DISC NAME/TRACK NAME | | | | 584 |
| | DISC NAME/TRACK NAME | | | LINK INFORMATION | 585 |
| (FFh) | DISC NAME/TRACK NAME | | | | 586 |
| | DISC NAME/TRACK NAME | | | LINK INFORMATION | 587 |

U-TOC SECTOR 1

RECORDING A COMPLETE BROADCAST PROGRAM BY SELECTING FROM A DISPLAYED PROGRAM TEXT

BACKGROUND OF THE INVENTION

1. Field of the Invention

The present invention relates to a received information recording system suitable for a receiving system for receiving an FM (Frequency Modulation) text multiplexed broadcast of which text and dotted graphic information has been multiplexed with an FM broadcast.

2. Description of the Related Art

FM text multiplexed broadcasts of which text and dotted graphic information has been multiplexed with FM broadcasts have been started. In such FM text multiplexed broadcasts, text and dotted graphic information is encoded. For example, a subcarrier of 76 kHz is modulated with the encoded text and dotted graphic information so as to frequency multiplex the base band of the FM broadcast with the text and dotted graphic information. With the FM text multiplexed broadcast, sub programs in association with main programs, traffic information, weather information, entertainment information, and so forth are transmitted. With a sub program, music program titles and artist names of music programs in a main program, messages of personalities and guests thereof, the address and telephone number for requests are transmitted. A conventional FM receiver corresponding to the FM text multiplexed broadcast function displays text information and so forth on a liquid crystal display or the like. Thus, the user can obtain various information from the liquid crystal display.

In FM broadcasts, a variety of music programs have been transmitted. When the user records music programs transmitted in the FM broadcasts with an MD (Mini Disc) recorder or a compact cassette recorder, he or she should press the record button corresponding to a desired music program. However, in this case, unless the user pays attention to the desired music program, the start portion thereof cannot be correctly recorded due to a delay of the operation of the record button. Alternatively, with reference to an FM radio program guide on a newspaper, the user can record a desired program with a timer recording mode. However, in this case, the user should edit the music programs that have been recorded after recording. Thus, conventionally, it is troublesome to record only his or her desired music programs.

OBJECTS AND SUMMARY OF THE INVENTION

Therefore, an object of the present invention is to provide a receiving system that can automatically select a music program corresponding to a desired music program title or a desired artist name that has been set up by the user from those received from FM broadcasts.

Another object of the present invention is to provide a receiving system that automatically selects a music program corresponding to a desired music program title or a desired artist name with information received from an FM text multiplexed broadcast and records the selected music program without a lost portion of the desired program.

The present invention is a received information recording system, having a receiver for receiving a broadcast signal of which program information has been multiplexed with text information and demodulating the program information from the received broadcast signal, a text information detector for detecting the text information from the broadcast signal received by the receiver, a recorder for recording the program information of the broadcast signal received by the receiver to a record medium, an input key for inputting predetermined text information, a comparator for comparing the text information received from the input key with the text information detected by the text information detector, and a controller for causing the program information of the received broadcast signal to be recorded to the record medium when the text information received from the input key accords with the text information detected by the text information detector.

With text information multiplexed with an FM broadcast, a music program corresponding to a desired music program title or a desired artist name can be automatically recorded. In addition, a predetermined amount of received audio data is stored in a memory. Thus, when a music program corresponding to a desired music program title or a desired artist name is automatically selected and recorded, the start portion of the recorded music program is not lost.

BRIEF DESCRIPTION OF THE DRAWINGS

FIGS. 3A to 3D are schematic diagrams for explaining an audio system corresponding to the present invention;

FIG. 4 is a schematic diagram for explaining U-TOC;

FIG. 5 is a schematic diagram for explaining U-TOC;

DETAILED DESCRIPTION OF THE PREFERRED EMBODIMENTS

Figure 1:
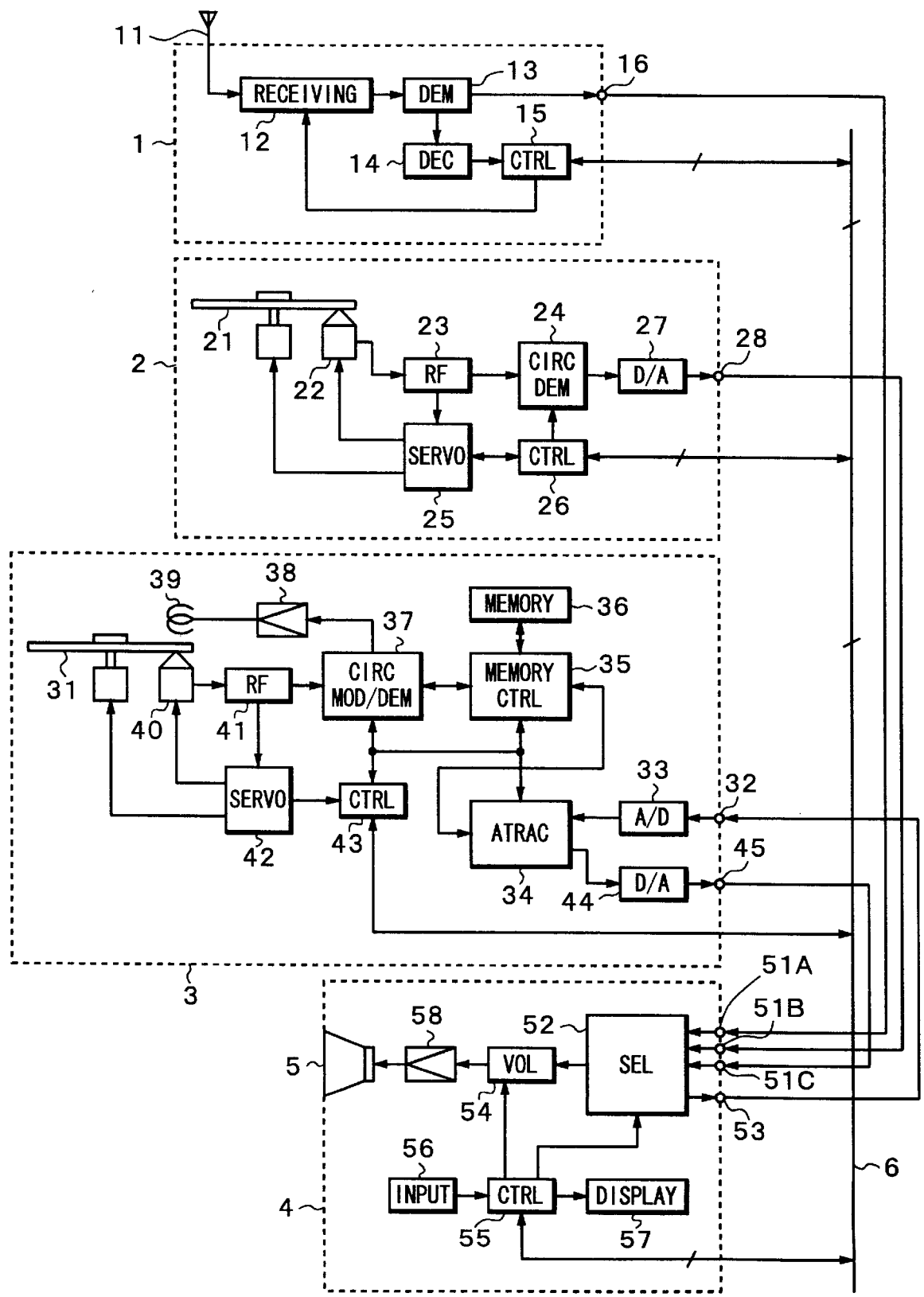
FIG. 1 is a block diagram showing an example of an audio system corresponding to the present invention.

Next, with reference to the accompanying drawings, embodiments of the present invention will be described. FIG. 1 shows an example of an audio system according to the present invention. In FIG. 1, reference numeral 1 is an FM tuner. Reference numeral 2 is a CD (Compact Disc) player. Reference numeral 3 is an MD player and recorder. Reference numeral 4 is an audio amplifier.

The FM tuner 1 receives an FM broadcast and demodulates an audio signal therefrom. In addition, the FM tuner 1 decodes text and graphic information that has been multiplexed with the FM broadcast. An FM broadcast signal received by an antenna 11 is supplied to a receiving circuit 12. The receiving circuit 12 selects a desired FM broadcast under the control of a controller 15. The selected FM broadcast signal is converted into an intermediate frequency signal. An output signal of the receiving circuit 12 is supplied to a demodulating circuit 13. The demodulating circuit 13 demodulates an audio signal from the received FM broadcast signal. The demodulated audio signal is output from an output terminal 16. An output signal of the demodulating circuit 13 is supplied to a multiplexed text decoder 14. The multiplexed text decoder 14 demodulates text and graphic information that has been multiplexed with the FM broadcast. The demodulated text and graphic information is supplied to the controller 15.

The CD player 2 reproduces a signal from a compact disc 21. An optical pickup 22 reproduces a signal recorded on the compact disc 21. The reproduced signal is supplied to a demodulating and CIRC (Cross Interleave Read-Solomon Code) decoder circuit 24 through an RF amplifier 23. In addition, the reproduced signal is supplied to a servo circuit 25. The servo circuit 25 performs servo processes such as a spindle servo process, a tracking servo process, and a focus servo process. The demodulating and CIRC decoder circuit 24 EFM (Eight to Fourteen Demodulation) demodulates the reproduced signal of the compact disc 21 and then performs an error correcting process with CIRC, thereby decoding a digital audio signal. The digital audio signal is supplied from the demodulating and CIRC decoder circuit 24 to a D/A (Digital to Analog) converter 27. The D/A converter 27 converts a digital audio signal into an analog audio signal. The analog audio signal is output from an output terminal 28.

The MD player and recorder 3 records and reproduces a signal to/from a mini disc 31. In a record mode, an audio signal is supplied from an input terminal 32 to an A/D converter 33. The A/D converter 33 converts an analog audio signal into a digital audio signal. An output signal of the A/D converter 33 is supplied to an audio compressing encoder and decoder 34. The audio compressing encoder and decoder 34 compresses the digital audio signal. The compressed digital audio signal is temporarily stored in a memory 36 under the control of a memory controller 35. An output signal of the memory 36 is supplied to a modulating and demodulating and CIRC encoder and decoder 37. The modulating and demodulating and CIRC encoder and decoder 37 performs an error correction encoding process with CIRC for the compressed digital audio signal. In addition, the modulating and demodulating and CIRC encoder and decoder 37 EFM modulates the recorded signal. An output signal of the modulating and demodulating and CIRC encoder and decoder 37 is supplied to a magnetic head 39 through a driver 38. An optical pickup 40 is disposed opposite to the magnetic head 39. A magnetic field of the magnetic head 39 is supplied to the mini disc 31. In addition, laser light of the optical pickup 40 is radiated to the mini disc 31 so as to record the compressed digital audio signal to the mini disc 31.

In a reproduction mode, a recorded signal of the mini disc 31 is reproduced by the optical pickup 40. The reproduced signal is supplied to the modulating and demodulating and CIRC encoder and decoder 37 through an RF amplifier 41. In addition, the recorded signal is supplied to a servo circuit 42. The servo circuit 42 performs servo processes such as a spindle servo process, a tracking servo process, and a focus servo process under the control of a controller 43. The modulating and demodulating and CIRC encoder and decoder 37 EFM demodulates the reproduced signal and performs the error correcting process with CIRC for the demodulated signal. The modulating and demodulating and CIRC encoder and decoder 37 decodes the compressed digital audio signal. An output signal of the modulating and demodulating and CIRC encoder and decoder 37 is temporarily stored in the memory 36 under the control of the memory controller 35. An output signal of the memory 36 is supplied to the audio compressing encoder and decoder 34. The audio compressing encoder and decoder 34 performs an expanding process for the digital audio signal. The expanded digital audio signal that is output from the audio compressing encoder and decoder 34 is supplied to a D/A converter 44. The D/A converter 44 converts the digital audio signal into an analog audio signal. The analog audio signal is output from an output terminal 45.

The audio amplifier 4 selects an audio signal from a plurality of audio units. The audio amplifier 4 amplifies the power of the audio signal of the selected audio unit and supplies the resultant signal to a speaker 5. In this example, the audio amplifier 4 has input terminals 51A, 51B, and 51C. Audio signals received from the FM tuner 1, the CD player 2, and the MD recorder 3 are supplied to the input terminals 51A, 51B, and 51C, respectively. The audio amplifier 4 has an output terminal 53. An output signal that is output from the output terminal 53 is supplied to the MD player and recorder 3. In addition, the audio amplifier 4 has a controller 55. The controllers 15, 26, and 43 of the FM tuner 1, the CD player 2, and the MD player and recorder 3 are bidirectionally connected with the controller 55 of the audio amplifier 4 through a bus 6.

The audio signals received from the input terminals 51A, 51B, and 51C are supplied to a selector 52. An input signal of an input key pad 56 is supplied to the controller 55. The selector 52 is set up corresponding to the input signal of the input key pad 56. In addition, various setup states are displayed on a display 57 connected to the controller 55. The selector 52 selects a desired one of the audio signals received from the input terminals 51A, 51B, and 51C. The selected audio signal is supplied to an electronic volume controlling circuit 54. The electronic volume controlling circuit 54 controls the volume of the selected audio signal and supplies the resultant signal to an amplifier 58. The electronic volume controlling circuit 54 is controlled by the controller 55. The amplifier 58 amplifies the power of the audio signal. An output signal of the amplifier 58 is supplied to the speaker 5.

In the system according to the present invention, as described above, the FM tuner 1 has the multiplexed text decoder 14 that receives an FM text multiplexed broadcast and decodes text and graphic information. In the FM text multiplexed broadcast, text and graphic information is encoded. A sub-carrier of 75 kHz is modulated with the encoded text and graphic information. The resultant sub-carrier is frequency multiplexed with the base band of the FM broadcast.

The base band signal of the FM stereo broadcast is composed of a main channel signal, a sub channel signal, and a pilot signal. The main channel signal is composed of a mixed signal of an L (left) channel signal and an R (right) channel signal. The sub channel signal is formed by modulating the sub carrier with a difference signal of an L channel signal and an R channel signal. In the FM text multiplexed broadcast, a multiplexed signal of which a sub carrier of 76 kHz has been modulated with text and graphic information is frequency-division multiplexed.

Such an FM text multiplexed broadcast is referred to as DARC (Data Radio Channel) system. The DARC system has been defined as follows.

Sub carrier frequency: 76 kHz

Transmission rate: 16 kbits/sec

Modulation system: LMSK (Level Controlled Minimum Shift Keying)

Error correction system: Product coding using (272, 190) compact difference cyclic code Program services of text information and so forth are categorized as levels 1, 2, and 3. Level 1 is a service for receivers that can display text information (15.5 columns× 2.5 lines) including a header portion. Level 2 is a service for receivers that can display text and graphic information (15.5 columns×8.5 lines) including a header portion. Level 3 is a service for receivers that can display such as map information of CD-ROM or the like (for example, traffic information for navigation systems).

Examples of the service of Level 1 are a sub program in association with a main program (such as a music program title and an artist name of a music program, messages of a personality and guests of a radio program, address and telephone number for requests to a program), traffic information showing a route, regional weather information, and entertainment information.

The FM tuner 1 according to the present invention has the multiplexed text decoder 14 that can receive services of at least Level 1.

In FIG. 1, the multiplexed text decoder 14 of the FM tuner 1 decodes text and graphic information. The text and graphic information is supplied from the controller 15 of the FM tuner 1 to the controller 55 of the audio amplifier 4 through the bus 6. Text and graphics corresponding to the text and graphic information are displayed on the display 57.

In the system according to the present invention, a text searching and recording mode for automatically selecting a music program corresponding to a desired music program title or a desired artist name with information of the FM text multiplexed broadcast and for recording the music program can be set up.

When the entire system is controlled by the controller 55 of the audio amplifier 4, the text searching and recording mode is set up. With the input key pad 56 of the audio amplifier 4, a desired music program title or a desired artist name is input. The FM tuner 1 receives an FM text multiplexed broadcast. The multiplexed text decoder 14 decodes text and graphic information of the FM text multiplexed broadcast. An output signal of the multiplexed text decoder 14 is supplied to the controller 55 of the audio amplifier 4 through the bus 6. The controller 55 compares the received text information with the pre-set text information.

As described previously, a sub program in association with a main program in an FM text multiplexed broadcast includes a music program title and an artist name of a music program of a main program that is being broadcast. Thus, when the received text information is compared with the pre-set text information, it can be determined whether or not the music program tile and artist name obtained by the received text information accord with the pre-set music program title and artist name. When it has been determined that they accord, the controller 55 of the audio amplifier 5 supplies a record command to the controller 43 of the MD player and recorder 3. Thus, the MD player and recorder 3 can record a music program corresponding to a desired artist name to the mini disc 31.

However, occasionally, the transmission timing of the text information such as a music program title and an artist name transmitted with an FM multiplexed signal may not accord with the start timing of the music program being broadcast. In addition, to start recording a music program with the MD player and recorder 3, a preparation time for each system unit is required. Thus, even if the music program is recorded just after the text of the desired music program title or the desired artist name is detected from the FM text multiplexed broadcast, the start portion of the music program may be lost.

To solve such a program, in the example, a predetermined amount of a digital audio signal corresponding to an audio signal demodulated by the FM tuner 1 is always stored in the memory 36 of the MD recorder 3. While the audio signal is stored in the memory 36, recording process for writing mini disc 31 is not being done.

Figure 2A:
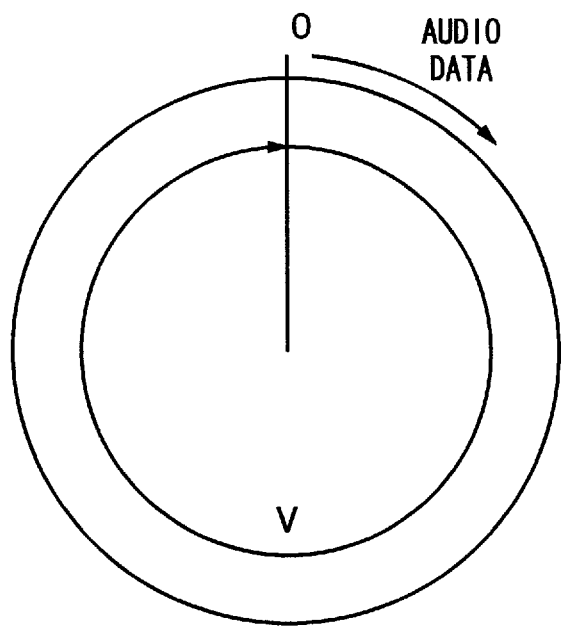
FIGS. 2A and 2B are schematic diagrams for explaining an audio system corresponding to the present invention.
Figure 2B:
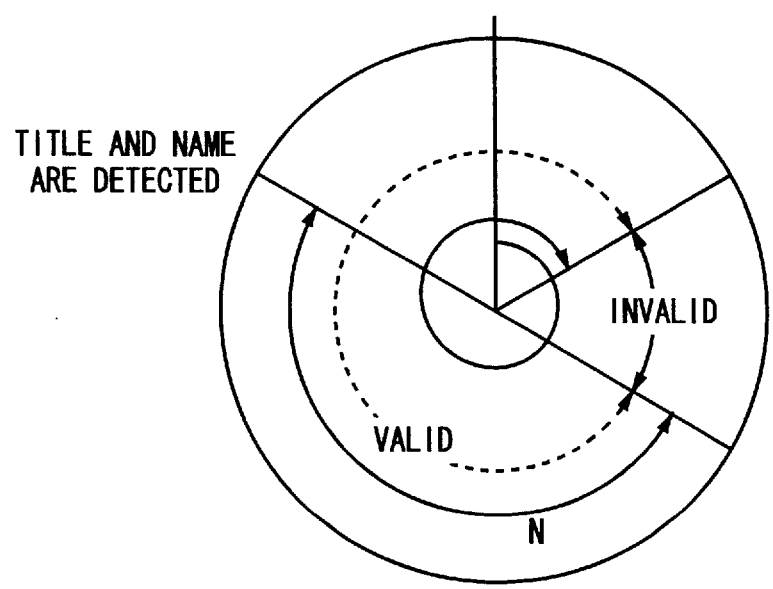

As shown in FIG. 2A, memory 36 is a construction of a ring buffer memory, the latest information is always stored in the memory 36. When the memory 36 becomes full, older information is removed so that the latest information remains. Thus, a predetermined amount V of information corresponding to a digital audio signal of a received FM broadcast is stored. When text of a desired music program title or a desired artist name is detected as shown in FIG. 2B, the information stored in the memory 36 is traced back by N and the information after the traced-back point is validated. The remaining information stored in the memory 36 is invalidated. The validated digital audio signal after the traced-back point is recorded. Thus, the start portion of the music program can be prevented from being lost.

The predetermined amount N to be traced back in the memory 36 can be set up by the user corresponding to the difference between the transmission timing of the text information of the music program title and artist name transmitted in an FM text multiplexed broadcast and the timing of the music program being broadcast, the preparation time for starting recording the music program with the MD recorder 3, and so forth. While the text information received by the FM tuner 1 accords with the pre-set text information, the music program is continuously recorded. When the text information received by the FM tuner 1 does not accord with the pre-set text information, with a delay of a predetermined time period, the recording operation of the MD player and recorder 3 for the music program is stopped.

Alternatively, the start portion of a music program may be determined by detecting the level of digital audio data stored in the memory 36. As shown in FIG. 3A, in a conventional FM broadcast, there is a speech portion $T_1$, followed by an introduction of the music program $T_2$, followed by a no-sound portion $T_3$, followed by a music program portion $T_4$. Thus, when the no-sound area is detected after the introduction $T_2$ of the music program, it is assumed that the music program starts.

As shown in FIG. 3B, the predetermined amount V of audio signal of the received FM broadcast is always stored in the memory 36. When the no-sound area is detected, as shown in FIG. 3C, a pointer P is placed at an address corresponding to the no-sound area of the memory 36. When the music program corresponding to the desired music program title or desired artist name is detected, as shown in FIG. 3D, the audio signal after the pointer P becomes valid. Thus, the information is read from the address of the pointer P.

A mini disc has a U-TOC in which management information of recorded programs thereof is recorded. When a music program corresponding a desired music program title or a desired artist name is selected and recorded with text information multiplexed with an FM text multiplexed broadcast, after the music program is completely recorded, the data of U-TOC is rewritten.

In the case that the audio signal is traced back by the predetermined amount N from the position at which the text of the music program corresponding to the desired music program title or desired artist name is detected or in the case that when the no-sound area is detected and then text corresponding to a desired music program title or desired artist name is detected, the music program is recorded after the detected no-sound area, the data of U-TOC data is edited corresponding to the recorded music program and then recorded.

In addition, a disc name and track names can be recorded in U-TOC. In an FM text multiplexed broadcast, information of music program titles and artist names are transmitted. Thus, after a music program has been completely recorded, text information or the like of music programs transmitted in the FM text multiplexed broadcast can be recorded to U-TOC.

FIG. 4 shows a structure of sector 0 of U-TOC. At the top of the sector 0 of U-TOC, a header is recorded. Thereafter, a maker code, a model code, a first music program number, a last program number, sector use information, a disc serial number, a disc ID, and so forth are recorded. Various table pointer (P-DFA (Pointer for Defective Area), P-EMPTY (Pointer for Empty Slot), P-TN01 to P-TN0255) are recorded as table pointer data portion so as to identify music program area and free area recorded corresponding to the management table portion.

As a management table portion, 255 part tables (01h) to (FFh) are provided. Each part table includes a start address as a start point of a part, an end address as an end point thereof, and mode information (track mode) thereof. The positions of the part tables of the management table portion are represented by the table pointers P-TNO001 to P-TNO255. A part of a part table may be connected to another part. Thus, link information that represents part tables of connected parts is recorded.

FIG. 5 shows a structure of sector 1 of U-TOC. At the top of sector 1 of U-TOC, as shown in FIG. 5, a header is recorded. Thereafter, pointers P-EMPTY, P-TNA1, P-TNA2, P-TNA3, . . . and P-TNA255 that represent blank area and name tables are recorded. Disc names or track names are recorded to positions represented by the pointers P-TNA1, P-TNA2, P-TNA3, . . . and P-TNA255. The disc names or track names can be connected to other disc names and track names with connection information. Music program titles and artist names transmitted in an FM text multiplexed broadcast are recorded to disc names or track names of the U-TOC area (sector 1 of U-TOC).

Figure 6:
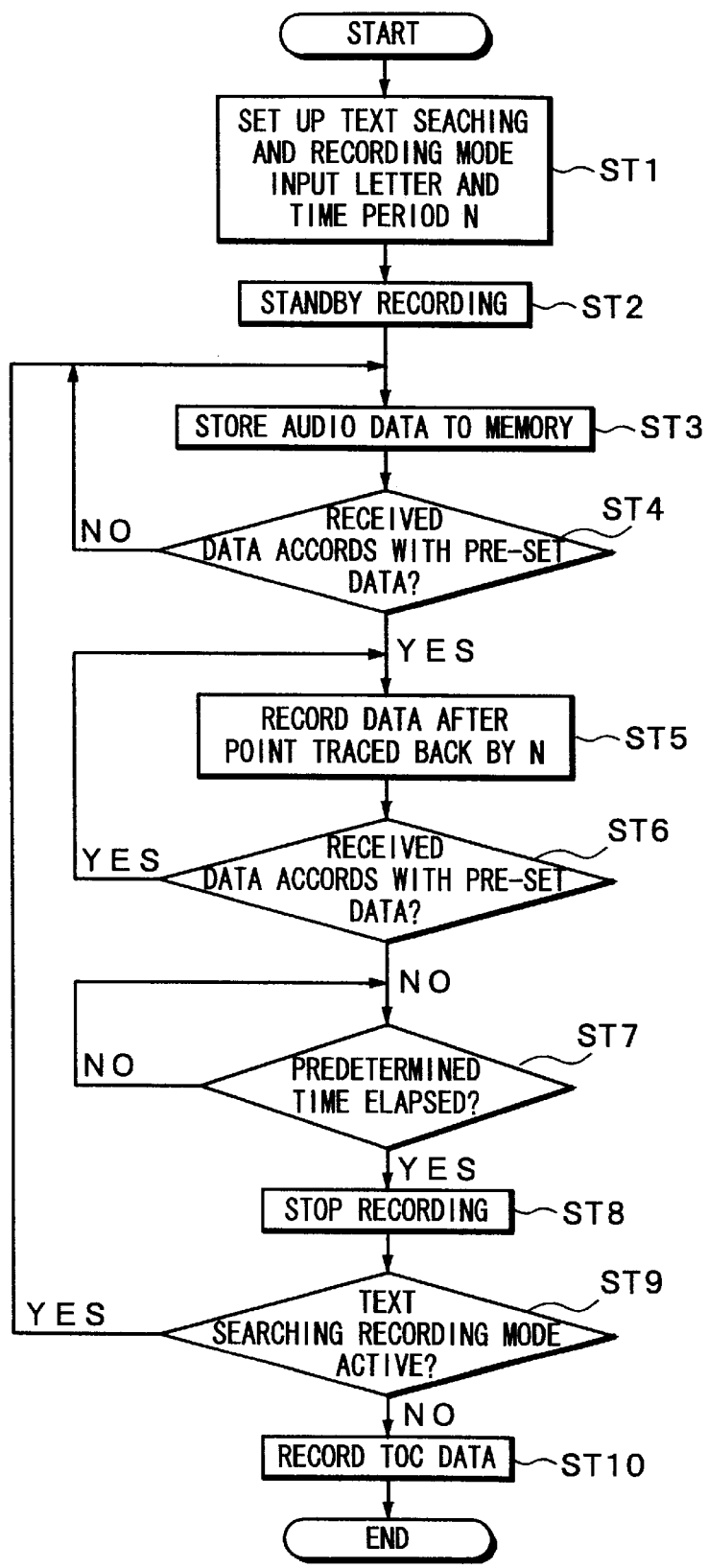
FIG. 6 is a flow chart for explaining an example of an audio system corresponding to the present invention.

FIG. 6 is a flow chart showing a process for automatically searching a music program corresponding to a desired music program title or a desired artist name with text information transmitted in an FM multiplexed broadcast and recording the music program. In this example, a predetermined amount of a digital audio signal that has been received is always stored in the memory 36. When text corresponding to a predetermined music program title or a predetermined artist name has been detected, a predetermined amount of information stored in the memory 36 is traced back and validated. The digital audio signal is recorded from the point of which the digital audio signal has been validated.

As shown in FIG. 6, when a music program corresponding to a desired music program title or a desired artist name is automatically searched and recorded with text information transmitted in an FM multiplexed broadcast, the text to be searched is input and the trace-back time period N is input. The system is set up to the text searching and recording mode (at step ST1). Thereafter, the selector 52 of the audio amplifier 4 is set up so that the output signal of the FM tuner 1 is recorded by the MD player and recorder 3. The MD recorder 3 is set up in a record standby state (at step ST2).

After the selector 52 of the audio amplifier 4 has been set up in such a manner, the audio signal demodulated by the FM tuner 1 is supplied to the MD player and recorder 3 through the selector 52. The audio signal received from the FM tuner 1 is supplied to the A/D converter 33 of the MD player and recorder 3. The A/D converter 33 digitizes the received audio signal. The digitized audio signal is supplied to the audio compressing encoder and decoder 34. The compressed audio signal is supplied to the memory 36. The memory 36 stores the compressed audio signal (at step ST3).

The text information received by the FM tuner 1 is compared with the pre-set text information (at step ST4). When they do not accord, the flow returns to step ST3. At step ST3, information corresponding to the received audio signal is stored in the memory 36. When the memory 36 becomes full, older information is removed in such a manner that the latest information remains. A predetermined amount of information is always stored in the memory 36.

When the determined result at step ST4 is Yes, in the memory 36, the information traced back by the time period N is validated. The remaining information stored in the memory 36 is invalidated. Thus, the audio signal is recorded from the point of which the time period N is traced back from the point of which the received text information accords with the pre-set text information (at step ST5).

It is determined whether or not the text information received by the FM tuner 1 accords with the pre-set text information (at step ST6). When the determined result at step ST6 is Yes, the flow returns to step ST5. While the received text information accords with the pre-set text information, the audio information is continuously recorded.

When the determined result at step ST6 becomes No, after a predetermined time period (at step ST7), the recording operation of the audio signal is stopped (at step ST8). Thereafter, it is determined whether or not the text searching and recording mode is still active (at step ST9). When the determined result at step ST9 is Yes, the flow returns to step ST3. When the text information received by the FM tuner 1 accords with the pre-set text information, the audio signal is recorded.

When the determined result at step ST9 is No, U-TOC data is formed corresponding to the recording state. The U-TOC data is recorded to the mini disc (at step ST10). Thus, the text searching and recording mode is finished.

Figure 7:
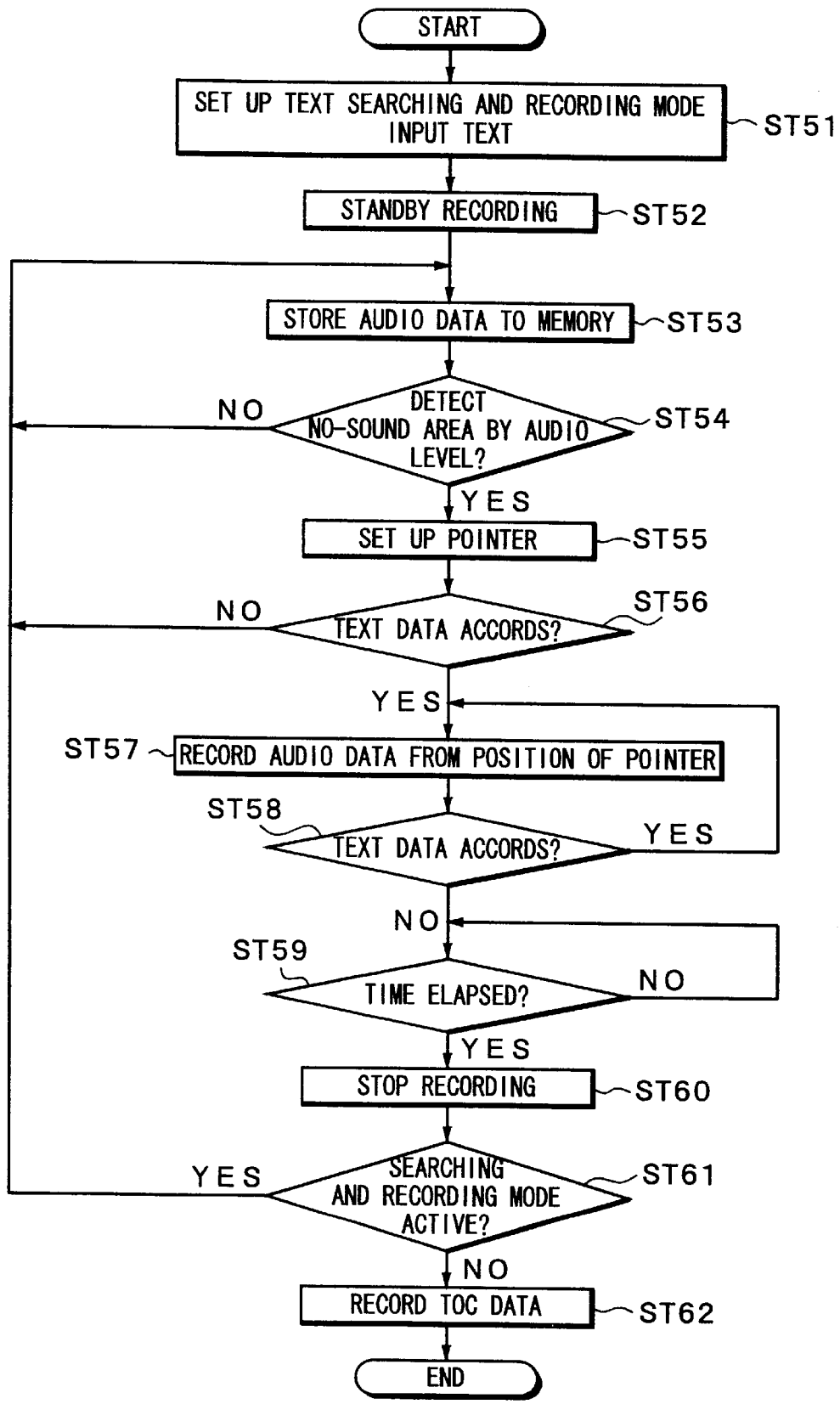
FIG. 7 is a flow chart for explaining an example of an audio system corresponding to the present invention.

FIG. 7 is a flow chart showing another example of the process for automatically searching a music program corresponding to a desired music program title or a desired artist name with text information transmitted in an FM multiplexed broadcast and recording the searched music program. In this example, the start portion of a music program is detected with a no-sound area. A pointer is placed at the start portion. When text corresponding to a desired music program title or a desired artist name is detected, information stored in the memory 36 is validated after the position of the pointer. The digital audio signal is recorded from the validated position.

As shown in FIG. 7, text to be searched is input. The system is set up to the text searching and recording mode (at step ST51). The selector 52 of the audio amplifier 4 is set up so that an output signal of the FM tuner 1 is recorded by the MD player and recorder 3. The MD player and recorder 3 is set up in the record standby state (at step ST52).

When the selector 52 of the audio amplifier 4 has been set up in such a manner, the audio signal demodulated by the FM tuner 1 is supplied to the MD player and recorder 3 through the selector 52. The audio signal received from the FM tuner 1 is supplied to the A/D converter 33 of the MD recorder 3. The A/D converter 33 digitizes the audio signal. The digitized audio signal is supplied to the audio compressing encoder and decoder 34. The audio compressing encoder and decoder 34 compresses the digitized audio signal. The resultant signal is stored in the memory 36 (at step ST53).

It is determined whether or not a no-sound area has been detected corresponding to the audio level (at step ST54). When the determined result at step ST54 is No, the flow returns to step ST53. When the determined result at step ST54 is Yes, the text information received by the FM tuner 1 is compared with the pre-set text information (at step ST56). When the determined result at step ST56 is No, the flow returns to step ST53. At step ST53, the information corresponding to the received audio signal is stored in the memory 36. When the memory 36 becomes full, older information is removed so that the latest information always remains. A predetermined amount of information is stored in the memory 36.

When the determined result at step ST56 is Yes, in the memory 36, the information after the position of the pointer is validated. The remaining data stored in the memory 36 is invalidated. Thus, the audio data after the position of the pointer is recorded (at step ST57).

Thereafter, it is determined whether or not the text information received from the FM tuner 1 accords with the pre-set text information (at step ST58). When the determined result at step ST58 is Yes, the flow returns to step ST57. While the received text information accords with the pre-set text information, the audio signal is continuously recorded.

When the determined result at step ST58 becomes No, after a predetermined time period (at step ST59), the recording operation of the audio signal is stopped (at step ST60). Thereafter, it is determined whether or not the text searching and recording mode is still active (at step ST61). When the determined result at step ST61 is Yes, the flow returns to step ST53. When the text information received from the FM tuner 1 accords with the pre-set text information, the audio signal is recorded.

When the determined result at step ST61 is No, U-TOC data is formed corresponding to the recording state. The U-TOC data is recorded to the mini disc (at step ST62). Thus, the text searching and recording mode is finished.

In the above-described example, with text information transmitted in an FM multiplexed broadcast, an audio signal is recorded by the MD player and recorder. However, the recording unit used in the system is not limited to such an MD player and recorder. The present invention can be applied for an analog compact cassette tape recorder, a digital tape recorder of which a digital audio signal is recorded to a tape by a rotating head, and a digital tape recorder of which an audio signal is compressed and recorded to a tape by a fixed head.

In the above-described example, the text information broadcasted in the FM text multiple broadcast is the information of the music program title and artist name. However, not only such information but also time information is contained in the text information. Therefore, a MD player and recorder with timer recording device using the time information in the FM text multiple broadcast may be realized. In such MD player and recorder with timer recording device, recording time information is inputted by user. The time information obtained from the FM text multiple broadcast is compared with the inputted recording time information. When the time information obtained from the FM text multiple broadcast accords with the inputted recording time information, the timer recording is started. In conventional timer recording device, a clock is required. However, the above-mentioned MD player and recorder with timer recording device, does not have to be provided the clock as the time information is obtained from the FM text multiple broadcast. That will make a profit for cutting the cost.

In the above-described example, a music program title or an artist name is searched and then an audio signal corresponding thereto is recorded. However, a plurality of search conditions may be set up. Of course, other than a music program title or an artist name of text information transmitted in an FM text multiplexed broadcast may be used as a search condition. In addition, a plurality of conditions may be set up for a plurality of items. AND or OR of these conditions and items may be used.

Figure 8:
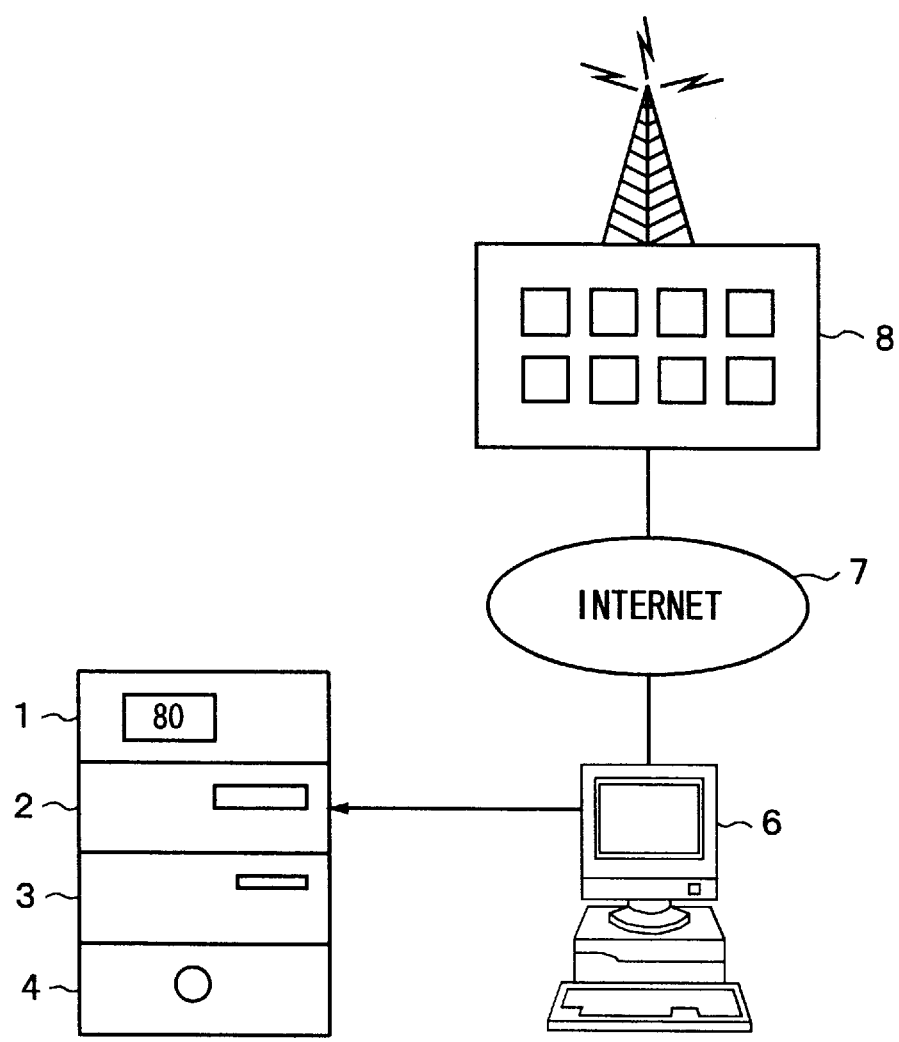
FIG. 8 is a perspective view for explaining another example of an audio system according to the present invention.

In the above-described examples, a music program title, an artist name, or the like is set up to the controller of the audio amplifier 4. However, as shown in FIG. 8, a personal computer 6 may be connected to such a system. When the personal computer 6 is connected to the system, with the keyboard, the user can easily input text such as a music program title, an artist name, or the like to be retrieved.

In the system with the personal computer 6, it can be connected to a computer network through Internet 7. Thus, when an FM broadcast station from which the user is listening to a program has a site 8 of Internet, the system can be connected to the site 8 of the FM broadcast station with the personal computer 6 through Internet. Thus, the user can obtain various information from the site 8 of the FM broadcast station.

It is considered that the site 8 of the FM broadcast station provides the listeners with information such as a title, an artist name, and so forth of a music program being broadcast. Thus, when the site 8 of the FM broadcast station has a service for providing the listeners with information such as a title and an artist name of a music program being broadcast, as with the text information transmitted in the previously described FM text multiplexed broadcast, with information obtained from the site 8 of the FM broadcast station through Internet, a music program corresponding to a desired music program title or a desired artist name can be selected and recorded.

What is claimed is:

1. A received information recording system, comprising:

receiving means for receiving a broadcast signal of which program information has been multiplexed with text information and demodulating the program information from the received broadcast signal;

text information detecting means for detecting received text information from the broadcast signal received by said receiving means;

recording means for recording the program information of the broadcast signal received by said receiving means to a record medium;

inputting means for inputting pre-set text information;

comparing means for comparing the pre-set text information received from said inputting means with the received text information detected by said text information detecting means;

controlling means for causing the program information of the received broadcast signal to be recorded to the record medium when the pre-set text information received from said inputting means accords with the received text information detected by said text information detecting means; and a memory for always storing a predetermined amount of the program information of the broadcast signal received by said receiving means, wherein the program information stored in said memory is validated after program information traced back by a predetermined amount from the time point when the pre-set text information received from said inputting means accords with the received text information detected by said text information detecting means, and wherein the program information that has been validated is recorded to the record medium.

2. The received information recording system as set forth in claim 1, wherein the predetermined amount of the program information that has been traced back is set up by a user.

3. The received information recording system as set forth in claim 2,
wherein the record medium has a program area for recording the program information and a management area for managing the program information,
wherein the program information stored in said memory is validated after program information traced back by a predetermined amount from the time point when the pre-set text information received from said inputting means accords with the received text information detected by said text information detecting means, and
wherein the management area is edited as the program information that has been validated is recorded to the record medium.

4. The received information recording system as set forth in claim 3,
wherein when the comparing means determines that the pre-set text information accords with the received text information, the received text information is recorded to the management area corresponding to the program information.

5. The received information recording system as set forth in claim 1, further comprising:
detecting means for detecting a delimitation of the program information,
wherein a point is placed at the delimitation of the program information stored in said memory, wherein program information is validated after the position of the point when the pre-set text information received from said inputting means accords with the received text information detected by said text information detecting means, and
wherein the program information that has been validated is recorded to the record medium.

6. The received information recording means as set forth in claim 5,
wherein the record medium has a program area for recording the program information and a management area for managing the program information,
wherein program information stored in said memory is validated after the program information at the position of the point when the pre-set text information received from said inputting means accords with the received text information detected by said text information detecting means, and
wherein the management area is edited as the program information of the received broadcast signal is recorded to the program area of the record medium.

7. The received information recording system as set forth in claim 6,
wherein when the comparing means determines that the pre-set text information accords with the received text information, the received text information is recorded to the management area corresponding to the program information.

8. The received information recording means as set forth in claim 1,
wherein the record medium has a program area for recording the program information and a management area for managing the program information, and
wherein the management area is edited when the pre-set text information received from said inputting means accords with the received text information detected by said text information detecting means as the program information of the received broadcast signal is recorded to the program area of the record medium.

9. The received information recording system as set forth in claim 8,
wherein when the comparing means determines that the pre-set text information accords with the received text information, the received text information is recorded to the management area corresponding to the program information.

10. The received information recording system as set forth in claim 1,
wherein the record medium has a program area for recording the program information and a management area for managing the program information,
wherein the program information stored in said memory is validated after program information traced back by a predetermined amount from the time point when the pre-set text information received from said inputting means accords with the received text information detected by said text information detecting means, and
wherein the management area is edited as the program information that has been validated is recorded to the record medium.

11. The received information recording system as set forth in claim 10,
wherein when the comparing means determines that the pre-set text information accords with the received text information, the received text information is recorded to the management area corresponding to the program information.

* * * * *